(12) United States Patent
English

(10) Patent No.: US 7,984,259 B1
(45) Date of Patent: Jul. 19, 2011

(54) REDUCING LOAD IMBALANCE IN A STORAGE SYSTEM

(75) Inventor: Robert M. English, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 507 days.

(21) Appl. No.: 11/957,925

(22) Filed: Dec. 17, 2007

(51) Int. Cl.
*G06F 5/06* (2006.01)

(52) U.S. Cl. ............ 711/165; 711/114; 711/E12.019

(58) Field of Classification Search .......... 711/114, 711/165, E12.019
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,517,663 A | 5/1985 | Imazeki et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,817,035 A | 3/1989 | Timsit |
| 4,837,675 A | 6/1989 | Bean et al. |
| 4,849,929 A | 7/1989 | Timsit |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,088,081 A | 2/1992 | Farr |
| 5,124,987 A | 6/1992 | Milligan et al. |
| RE34,100 E | 10/1992 | Hartness |
| 5,155,835 A | 10/1992 | Belsan et al. |
| 5,163,131 A | 11/1992 | Row et al. |
| 5,274,799 A | 12/1993 | Brant et al. |
| 5,355,453 A | 10/1994 | Row et al. |
| 5,426,747 A | 6/1995 | Weinreb et al. |
| 5,568,629 A | 10/1996 | Gentry et al. |
| 5,581,724 A | 12/1996 | Belsan et al. |
| 5,802,366 A | 9/1998 | Row et al. |
| 5,819,292 A | 10/1998 | Hitz et al. |
| 5,828,876 A | 10/1998 | Fish et al. |
| 5,931,918 A | 8/1999 | Row et al. |
| 5,944,789 A | 8/1999 | Tzelnic et al. |
| 5,948,110 A | 9/1999 | Hitz et al. |
| 5,963,962 A | 10/1999 | Hitz et al. |
| 5,987,477 A | 11/1999 | Schmuck et al. |

(Continued)

FOREIGN PATENT DOCUMENTS

WO    WO 89/10594    11/1989

(Continued)

OTHER PUBLICATIONS

U.S. Appl. No. 11/692,589, filed Mar. 2007, English.

(Continued)

*Primary Examiner* — Shane M Thomas
*Assistant Examiner* — Hal Schnee
(74) *Attorney, Agent, or Firm* — Cesari and McKenna, LLP

(57) ABSTRACT

The present invention provides a system, method, and computer program product for reducing load imbalance in a storage system having a plurality of storage devices organized in one or more RAIDs for storing data by moving data from heavily-loaded storage devices to less-loaded storage devices during normal data access operations. As a result of moving data to less-loaded storage devices, the service latency of those storage devices decreases, thereby optimizing the system's performance.

26 Claims, 6 Drawing Sheets

U.S. PATENT DOCUMENTS

| | | | |
|---|---|---|---|
| 6,032,224 A * | 2/2000 | Blumenau | 711/117 |
| 6,131,252 A | 10/2000 | Hoheisel et al. | |
| 6,185,655 B1 | 2/2001 | Peping | |
| 6,289,356 B1 | 9/2001 | Hitz et al. | |
| 6,314,503 B1 | 11/2001 | D'Errico et al. | |
| 6,324,620 B1 * | 11/2001 | Christenson et al. | 711/112 |
| 6,457,021 B1 | 9/2002 | Berkowitz et al. | |
| 6,516,380 B2 | 2/2003 | Kenchammana-Hoskote et al. | |
| 6,636,879 B1 | 10/2003 | Doucette et al. | |
| 6,643,654 B1 | 11/2003 | Patel et al. | |
| 6,795,904 B1 * | 9/2004 | Kamvysselis | 711/162 |
| 6,865,650 B1 | 3/2005 | Morley et al. | |
| 7,035,972 B2 | 4/2006 | Guha et al. | |
| 7,194,597 B2 | 3/2007 | Willis et al. | |
| 7,263,590 B1 | 8/2007 | Todd et al. | |
| 7,281,108 B2 | 10/2007 | Todd et al. | |
| 7,409,494 B2 | 8/2008 | Edwards et al. | |
| 2002/0103969 A1 * | 8/2002 | Koizumi et al. | 711/114 |
| 2002/0124137 A1 | 9/2002 | Ulrich et al. | |
| 2003/0056058 A1 | 3/2003 | Veitch | |
| 2003/0212872 A1 * | 11/2003 | Patterson et al. | 711/165 |
| 2004/0030668 A1 | 2/2004 | Pawlowski et al. | |
| 2004/0139167 A1 | 7/2004 | Edsall et al. | |
| 2004/0172503 A1 * | 9/2004 | Merchant | 711/114 |
| 2004/0210724 A1 | 10/2004 | Koning et al. | |
| 2005/0240742 A1 * | 10/2005 | Eng et al. | 711/167 |
| 2006/0004957 A1 * | 1/2006 | Hand et al. | 711/113 |
| 2006/0031287 A1 * | 2/2006 | Ulrich et al. | 709/203 |
| 2006/0112242 A1 * | 5/2006 | McBride et al. | 711/161 |
| 2006/0206675 A1 * | 9/2006 | Sato et al. | 711/161 |
| 2006/0259686 A1 * | 11/2006 | Sonobe | 711/114 |
| 2007/0088702 A1 | 4/2007 | Fridella et al. | |
| 2007/0168633 A1 | 7/2007 | English et al. | |
| 2007/0255897 A1 * | 11/2007 | McNutt | 711/112 |
| 2007/0288712 A1 * | 12/2007 | Zimoto et al. | 711/162 |
| 2008/0263259 A1 * | 10/2008 | Sadovsky et al. | 711/100 |
| 2008/0270706 A1 * | 10/2008 | Fair et al. | 711/137 |

FOREIGN PATENT DOCUMENTS

| | | |
|---|---|---|
| WO | WO 02/093298 | 11/2002 |
| WO | WO 2006/055765 | 5/2006 |
| WO | PCT/US05/041794 | 7/2006 |

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

Callaghan, B., "NFS Version 3 Protocol Specification", Request for Comments (RFC) 1813 Jun. 1995, 118 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H, et al., Scale and Performance in a Distributed File System, Carnegie Mellon University, CMU-ITC-87-068, Aug. 5, 1987, 33 page.

Howard, John, H. et al., Scale and performance in a distributed file system, ACM Trans. Computer. System., 6(1), Feb. 1988 pp. 51-81.

Kazar, Michael L., Synchronization and Caching Issues in the Andrew File System, Carnegie Mellon University, CMU-ITC-88-063, 12 pages, 1988.

Miller, Ethan L., et al., Rama: A File System for Massively Parallel Computers, 12.sup.th IEEE Symposium on Mass Storage Systems, Monterey CA, Apr. 1993, pp. 163-168.

Nelson, Michael et al., "Caching in the Sprite Network File System", ACM, Nov. 1987, pp. 3-4.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Satyanarayanan, M., et al., Coda: A highly available file system for a distributed workstation environment Carnegie Mellon University, CMU-ITC, 1990, 5 pages.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Weikum, Gerhard, et al., Towards Self-Tuning Memory Management for Data Servers, Data Engineering Journal Feb. 22, 1999 pp. 3-11.

* cited by examiner

REDUCING LOAD IMBALANCE IN A STORAGE SYSTEM

RELATED APPLICATION

This application is related to a commonly-owned patent application Ser. No. 11/692,589, entitled "System and Method for Pausing Disk Drives in Aggregate," by Robert English, filed on Mar. 28, 2007.

FIELD OF THE INVENTION

The present invention pertains to storage systems, and more particularly, to reducing load imbalance in a storage system.

BACKGROUND

A storage system is a processing system adapted to store and retrieve data on behalf of one or more client processing systems ("clients") in response to external input/output (I/O) requests received from clients. A storage system can provide clients with a file-level access and/or a block-level access to data stored in a set of mass storage devices, such as magnetic or optical storage disks or tapes. The storage devices can be organized as one or more groups of Redundant Array of Independent (or Inexpensive) Disks (RAID).

Storage arrays may exhibit load imbalances from time to time in that some storage devices in a RAID array are accessed more frequently than others. As system load increases, those storage devices saturate, limiting overall system's performance while other storage devices are underutilized. Load imbalance may be caused by a variety of sources. For example, data blocks created at particular times may be accessed more frequently than those created at others. Thus, aggregate growth can create load imbalances. As used herein, an "aggregate" is a logical container for a pool of storage which combines one or more physical mass storage devices (e.g., disks) or parts thereof into a single logical storage object, which contains or provides storage for one or more other logical data sets at a higher level of abstraction (e.g., volumes). A "data block", as the term is used herein, is a contiguous set of data of a known length starting at a particular offset value.

Furthermore, storage devices with different response times or different ratios of access rate and capacity can create load imbalances. Storage devices with a larger capacity have more data stored on them than storage devices with a smaller capacity, and thus are accessed more frequently. For example, Advanced Technology Attachment (ATA) disks often hold more data and operate more slowly than other disks (e.g., Fibre Channel (FC) disks).

Some existing solutions attempt to resolve load imbalance by providing hierarchical storage in which storage devices are arranged according to their inherent characteristics, such as their access time. The access time refers to the amount of time it takes to locate and provide data from the media in response to a request. Access time reflects location of the media (e.g., local or remote) as well as time it takes to find the correct position of data on the individual media. Typically, tape drives have longer access times than disk drives and are more often used for archival storage located remotely from primary storage of disk drives. One such exemplary hierarchical system is described in U.S. Pat. No. 6,032,224 (referred to herein as '224 patent), assigned to EMC Corporation of Hopkinton, Mass. In such a system, storage devices are arranged based on their inherent access time so that the storage devices that have a low access time (such as disk drives) are arranged at the top of the hierarchy and storage devices that have a high access time (such as tape drives) are arranged at the bottom of the hierarchy. Among storage devices described in '224 patent that are arranged hierarchically are a solid state disk, a local disk, a network disk, an optical disk, a network optical disk, a local tape, and a network tape. With such a hierarchical arrangement, the '224 patent describes a system for monitoring a rate of access specifying a number of accesses or usage per unit of time of individual blocks of storage and moving more frequently used blocks to storage devices nearer the top of the hierarchy (such as disk drives) having inherently low access time and less often accessed blocks to storage devices nearer the bottom of the hierarchy (such as tape drives) with inherently high access time. Accordingly, hierarchical storage systems are generally directed towards providing overall system response improvements between primary, secondary, and lower levels of storage.

Hierarchical storage devices attempt to serve as many requests as possible from the fastest level of the hierarchy. However, segregating storage devices into "fast" and "slow" creates load imbalances. In such a hierarchy, requests are served from the top of the hierarchy (fast storage devices) and the bottom of the hierarchy feeds data to the top. This explicit concentration of requests into a subset of the total collection of storage devices creates load imbalance.

Accordingly, what is needed is a mechanism that reduces or eliminates load imbalance in the collection of storage devices without limitations imposed by prior art systems.

SUMMARY OF THE INVENTION

The present invention provides a system, method, and computer program product implemented on a storage system that reduces load imbalance in a primary storage, such as a RAID that includes storage devices of the same type (for example, having approximately the same revolutions per minute and seek time). In the RAID array, for example, storage devices may be all magnetic hard disk drives having approximately the same seek time at the time of creating an aggregate, which comprises of one or more RAIDs. As the storage devices within the RAID serve client access requests, their service latency changes over time. The service latency can be expressed as a sum of a seek time of an individual disk in the array (time to access data storage medium in response to a request) and the time the request waits in the queue to be processed by the disk. According to embodiments described herein, data blocks stored on storage devices that are overloaded due to serving client requests and thus having high service latency are written to another storage device in the same RAID or to another RAID in the aggregate during "normal" data access operations (i.e., operations initiated externally by clients requesting services of the storage system). As a result of implementing this aspect of the invention, service latency of storage devices having high service latency decreases, thereby improving overall system performance. Because the normal data access of storage devices having high service latency has already brought data into a memory of the storage system, the data move does not create an additional load on heavily loaded resources of the storage system. Furthermore, the data move does not require maintaining per-block recordkeeping to determine which data blocks to move. Moreover, the present invention, unlike prior art implementations, avoids explicit concentration of requests into a subset of the total collection of storage devices. Those skilled in the art would understand that the invention can be practiced with respect to storage devices in a volume, aggregate or other virtualized collection of storage devices.

According to one embodiment, the storage system executes a computer program including a load balancing module, a monitoring module, a cooling module, and a write allocation module. The monitoring module periodically monitors performance of hard disk drives in one or more RAIDs, measures service latency of individual storage devices in the array, and provides the estimated latency and identification (ID) of the disks to the load balancing module. The load balancing module identifies "hot" storage devices in the aggregate (e.g., storage devices having high latency) using, for example, individual storage device latency. The load balancing module sends to the cooling module an ID(s) of the hot storage devices that needs to be cooled (e.g., storage devices whose service latency will be reduced). The cooling module provides an indication in a storage devices data structure that a particular storage device is entering a cooling mode.

When a read request is received from a client system, a file system searches a buffer cache in the storage system's memory to determine if the requested data is in the memory. If the requested data is not stored in the memory, the file system creates a storage device request. The storage device request includes, for example, a buffer header, which indicates, for example, an address of a data block to read, an ID of a storage device where the data block is stored, and a number of blocks to read. The request is passed to a storage device driver system, which determines whether the request is made against a storage device that is in a cooling mode. If the requested device is in the cooling mode, the storage device driver system provides an indication in the buffer header that the storage device is in the cooling mode. The storage device driver system sends an I/O request to the storage device to retrieve the data block identified by the address. The storage device driver system sends the buffer header along with the retrieved data block back to the file system. The file system reads the buffer header to determine whether the request was made against the storage device that is in the cooling mode. If the request was made against the storage device that is in the cooling mode, the file system marks the data block, in the buffer header, for reallocation. In one implementation, the file system sets a "dirty" bit in the buffer header to indicate that the data block will be written to other storage devices.

The write allocation module identifies data blocks marked as "dirty" within the buffer cache, determines new locations for those data blocks that are marked as being in a cooling mode on other storage devices, and sends a request to the storage device driver system to write the data blocks to those locations on another storage device in the RAID or to another RAID.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION OF THE INVENTION

As used herein, a hard disk drive (HDD) or a disk is a digitally encoded non-volatile storage device, which stores data on rapidly rotating platters with magnetic surfaces.

A "block", as the term is used herein, is a contiguous set of data, typically, of a known length starting at a particular offset value. In certain embodiments of the invention, blocks contain 4 kBytes of data and/or metadata. In other embodiments, blocks can be of a different size.

An "aggregate" is a logical container for a pool of storage which combines one or more physical mass storage devices (e.g., RAID groups, which include one or more RAIDs) or parts thereof into a single logical storage object.

Figure 1A:
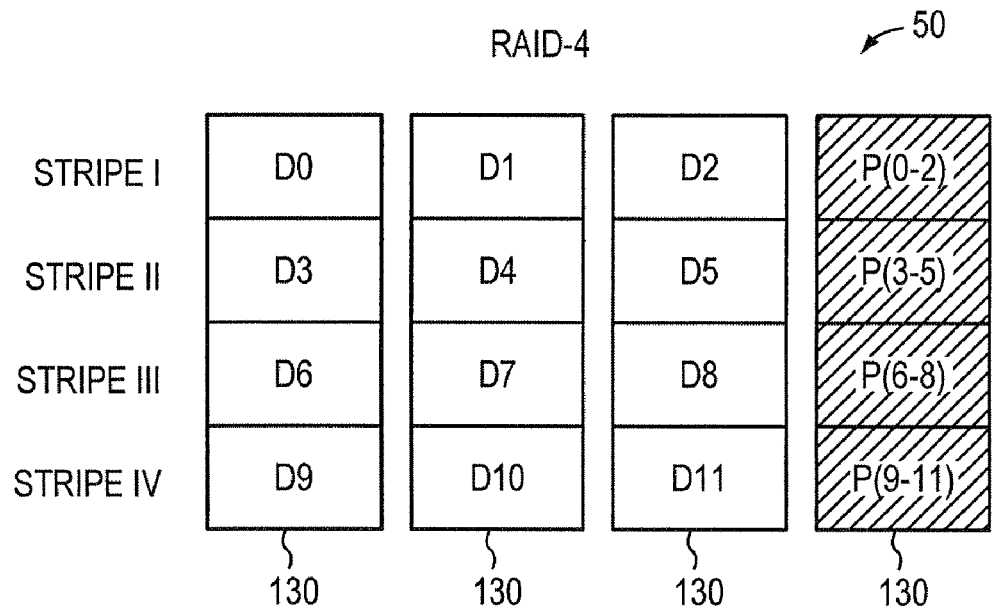
FIG. 1A is a diagram of a storage array for storing data according to RAID-4 implementation.
Figure 1B:
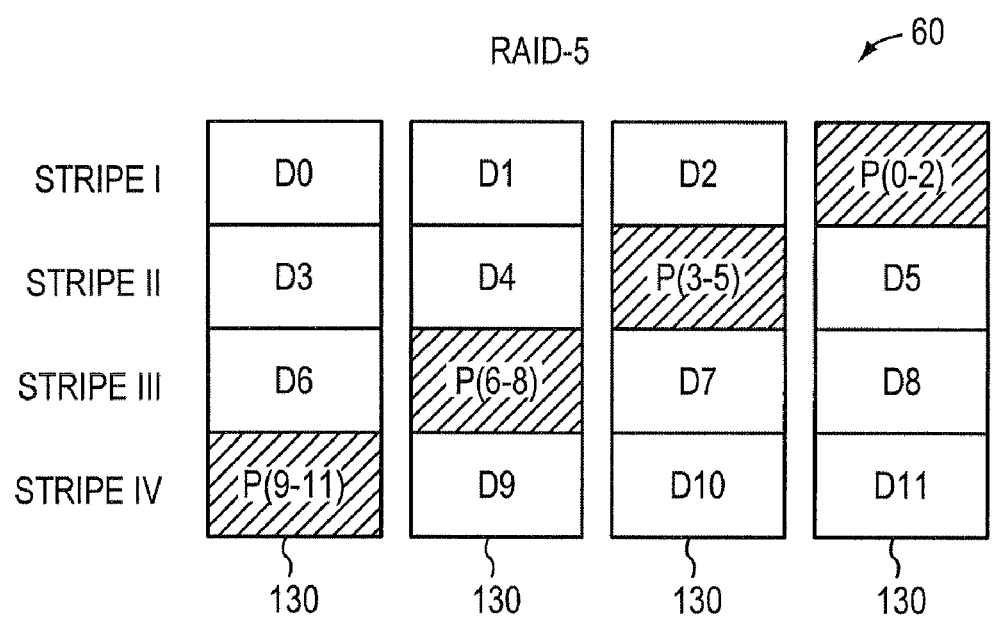
FIG. 1B is a diagram of a storage array for storing data according to RAID-5 implementation.

FIG. 1A illustrates an array 50 according to RAID-4 single parity scheme. FIG. 1B illustrates an array 60 according to RAID-5 single parity scheme. Those skilled in the art would understand that other types of RAIDs are also known, such as dual parity schemes though not shown on the Figures. Each RAID 50 and 60 includes magnetic hard disk drives 130 for storing data according to an embodiment of the present invention. Data in each array 50 and 60 are split to be stored across more than one disk drive in the array. The physical disks of each RAID group include those disks configured to store striped data (D) and those configured to store parity (P) for the data, in accordance, for example, with a RAID-4 level configuration (RAID array 50). Parity represents an error correction value that is used to recover data stored on the disks in the array in the event of a disk failure. Parity may be computed as a logical function performed on data blocks in a stripe spread across multiple disks in a disk array. In a single parity scheme, e.g. RAID-4 or RAID-5 (RAID array 60), an error can be corrected in any block in the stripe using a single parity block (also called "row parity"). In a dual parity scheme, e.g., RAID Double Parity (RAID-DP), errors resulting from a two-disk failure can be corrected using two parity blocks.

According to an embodiment of the present invention, each disk in the array may be a digitally encoded non-volatile storage device, which stores data on rapidly rotating platters with magnetic surfaces. Storage devices 130 within the illustrated RAID arrays 50 and 60 can have approximately the same seek time upon formation of the array. As the disks within an array are loaded with data, the disks' service latency dynamically changes. The service latency represents seek time and queue time (time the request is sitting in a queue to be served). Thus, the seek time of a disk in the array and the time the request is waiting in the queue are parameters that are dynamically changeable and operationally dependent on a load of a particular disk.

As described herein, load imbalances on storage devices result in limiting overall performance of a storage system. The present invention addresses this problem by providing a mechanism for reducing service latency on heavily loaded storage devices (storage devices having high service latency). Data blocks from heavily loaded storage devices are read into memory during "normal" data access operations and later written to less loaded storage devices. Notably, the present invention eliminates the need to perform a separate read request against data blocks stored on hot storage devices since the data has already been brought into the memory during a normal data access. Furthermore, the present invention does not segregate storage devices into "fast" and "slow" storage devices when forming an array of storage devices. All disk in the RAID array are of the same type, and upon formation of the array, all the disks have approximately the same seek time.

System Architecture

Figure 1C:
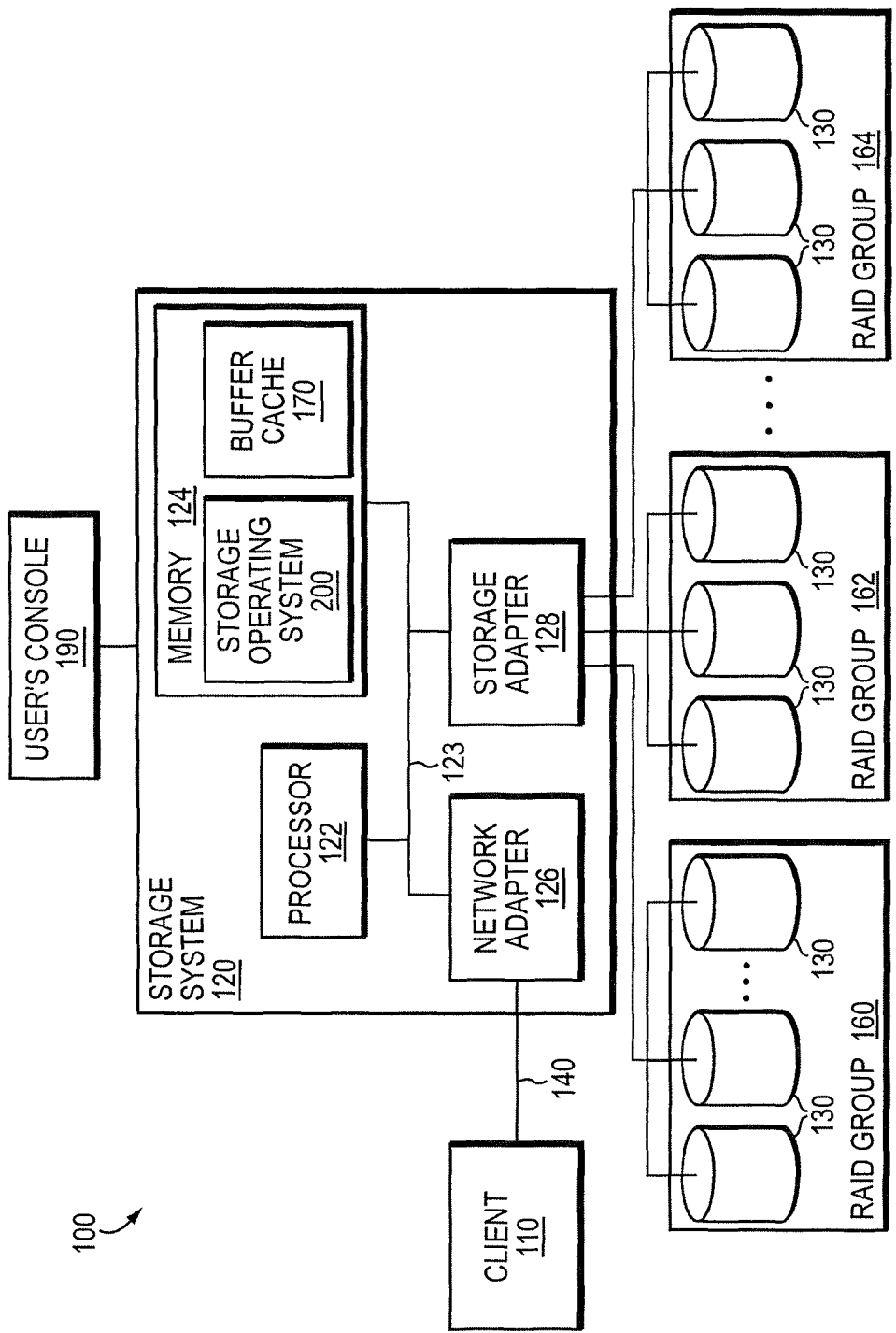
FIG. 1C is a diagram of network environment that includes a storage system according to an embodiment of the present invention.

FIG. 1C is a schematic block diagram of a storage system 120 connected to RAID arrays that implements the present invention. The storage system 120 is configured to provide storage service to clients, such as clients 110, with a file-level access to data stored in a set of mass storage devices, such as magnetic or optical storage disks or tapes. Alternatively, a storage system can provide clients with a block-level access to stored data, rather than file-level access, or with both file-level access and block-level access.

The storage system 120 is illustratively embodied as a system comprising a processor 122, a memory 124, a network adapter 126, and a storage adapter 128 interconnected by a system bus 123. The storage system 120 also includes a storage operating system 200 that includes a file system (such as file system 280 shown in FIG. 2) to logically organize the information as a hierarchical structure of directories, file and virtual disk (vdisk) storage objects on storage devices 130 (such as disks).

In the illustrative embodiment, the memory 124 comprises storage locations that are addressable by the processor 122 and adapters 126 and 128 for storing software program code, such as storage operating system 200, and data structures. According to an embodiment of the present invention, memory 124 stores various parameters, such as storage devices' latency.

A portion of the memory 124 may be further organized as a "buffer cache" 170 for storing certain data structures associated with the present invention as well as data blocks retrieved from storage devices 130. The processor 122 and adapters 126 and 128 may comprise processing elements and/or logic circuitry configured to execute the software code and manipulate the data structures. The storage operating system 200, portions of which are typically resident in memory 124, functionally organizes the storage system 120 by, inter alia, invoking storage operations in support of the storage service implemented by the storage system 120.

The network adapter 126 couples the storage system 120 to a client 110 over point-to-point links, wide area networks (WAN), virtual private networks implemented over a public network (Internet) or a shared local area network, hereinafter referred to as an illustrative network 140. For a Network Attached Storage (NAS)-based network environment, the client 110 is configured to access information stored on the storage system 120 as files. The network adapter 126 may comprise a network interface card (NIC) having the mechanical, electrical and signaling circuitry needed to connect the storage system 120 to a network switch. The client 110 communicates with the storage system 120 over network 140 by exchanging discrete frames or packets of data according to pre-defined protocols, such as the Transmission Control Protocol/Internet Protocol (TCP/IP).

The client 110 may be a general-purpose computer configured to execute applications over a variety of operating systems, including the UNIX® and Microsoft® Windows™ operating systems. A person of ordinary skill in the art would understand that although one client 110 is shown in FIG. 1C, any number of clients 110 can be connected to storage system 120. Clients generally utilize file-based access protocols when accessing information (in the form of files and directories) over a NAS-based network. Therefore, client 110 may request the services of the storage system 120 by issuing file access protocol messages (in the form of packets) to the storage system 120 over the network 140. For example, client 110 running the Windows operating system may communicate with the storage system 120 using the Common Internet File System (CIFS) protocol over TCP/IP. On the other hand, if client 110 runs the UNIX operating system, it may communicate with the multi-protocol storage system 120 using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the storage system 120 using other file access protocols.

Client 110 may be further configured to access the stored information as blocks on storage devices. In this Storage Area Network (SAN)-based network environment, network 140 maybe Fibre Channel (FC) network. The client 110 generally utilizes block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as the storage devices 130, to attach to the storage system 120.

The storage adapter 128 cooperates with the storage operating system 200 executing on the storage system 120 to access information requested by the clients 110. The information may be stored on the storage devices 130 or other similar media adapted to store information. The storage adapter includes I/O interface circuitry that couples to the storage devices over an I/O interconnect arrangement, such as a conventional high-performance, FC serial link topology. The information is retrieved by the storage adapter 128 and, if necessary, processed by the processor 122 (or the adapter 128) prior to being forwarded over the system bus 123 to the network adapter 126, where the information is formatted into packets or messages and returned to the clients 110.

Storage of information on the storage system 120 may be implemented as one or more storage volumes that comprise a cluster of physical storage devices 130 defining an overall logical arrangement of storage device space. The storage devices within a volume are typically organized as one or more RAID groups, e.g., RAID groups 160, 162, and 164 as shown in FIG. 1C. A RAID group may include one or more RAID arrays. While RAID arrays are typically used as primary data storage, often data can be mirrored to a secondary storage (e.g., further RAID arrays are arranged to store a duplicate data set to that of the primary storage or can be copied onto backup storage, such as archive tapes or optical storage devices). These devices tend to provide long-term storage of massive quantities of data for disaster recovery and are usually located remotely.

Storage system 120 can be connected to a user console 190, such as a monitor with a keyboard. A user can provision storage space on storage devices 130 via user console 190. To provision storage space, a user takes into consideration various factors, such as a schedule according to which data will be backed up on storage device(s) 130, the retention plan (i.e., how long the data is going to be maintained), whether the data is going to be replicated, and how often the data on storage device(s) is going to change.

Below provided description of various components of the storage system 120 to implement functionality of the invention.

Storage Operating System

Figure 2:
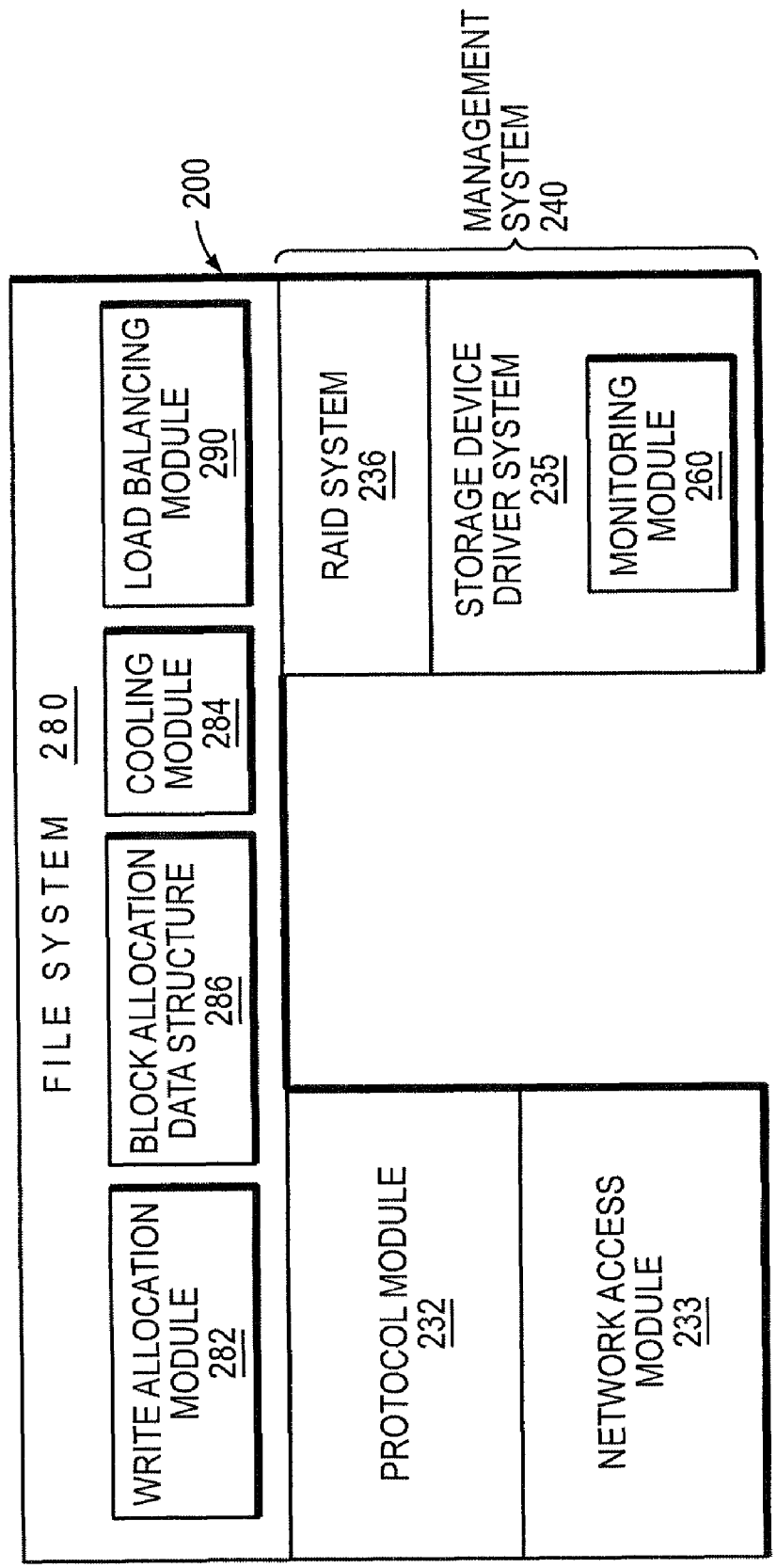
FIG. 2 is a diagram showing storage operating system of the storage system of FIG. 1C according to an embodiment of the present invention.

Referring now to FIG. 2, it illustrates various components of the storage operating system shown in FIG. 1C. In the illustrative embodiment, the storage operating system 200 is preferably the NetApp® Data ONTAP™ operating system available from Network Appliance Inc., of Sunnyvale, Calif., that implements a Write Anywhere File Layout (WAFL™) file system. However, it is expressly contemplated that any appropriate storage operating system, including a write in-place file system, may be enhanced for use in accordance with the inventive principles described herein to facilitate access to storage devices 130. As such, where the term "WAFL" is employed, it should be taken broadly to refer to any file system that is otherwise adaptable to the teachings of this invention. As used herein, the term "storage operating system" generally refers to the computer-executable code operable on a computer that manages data access. The storage operating system can be implemented as an application program operating over a general-purpose operating system, such as UNIX® or Windows NT®, or as a general-purpose operating system, which is configured for storage applications as described herein.

The file system 280 "virtualizes" the storage space provided by the storage devices 130. The file system 280 logically organizes the information as a hierarchical structure of name directories and file objects (hereinafter "directories" and "files") on the storage devices. Each "on-disk" file may be implemented as a set of blocks configured to store information, such as data, whereas the directory may be implemented as a specially formatted file in which names and links to other files and directories are stored.

Figure 4:
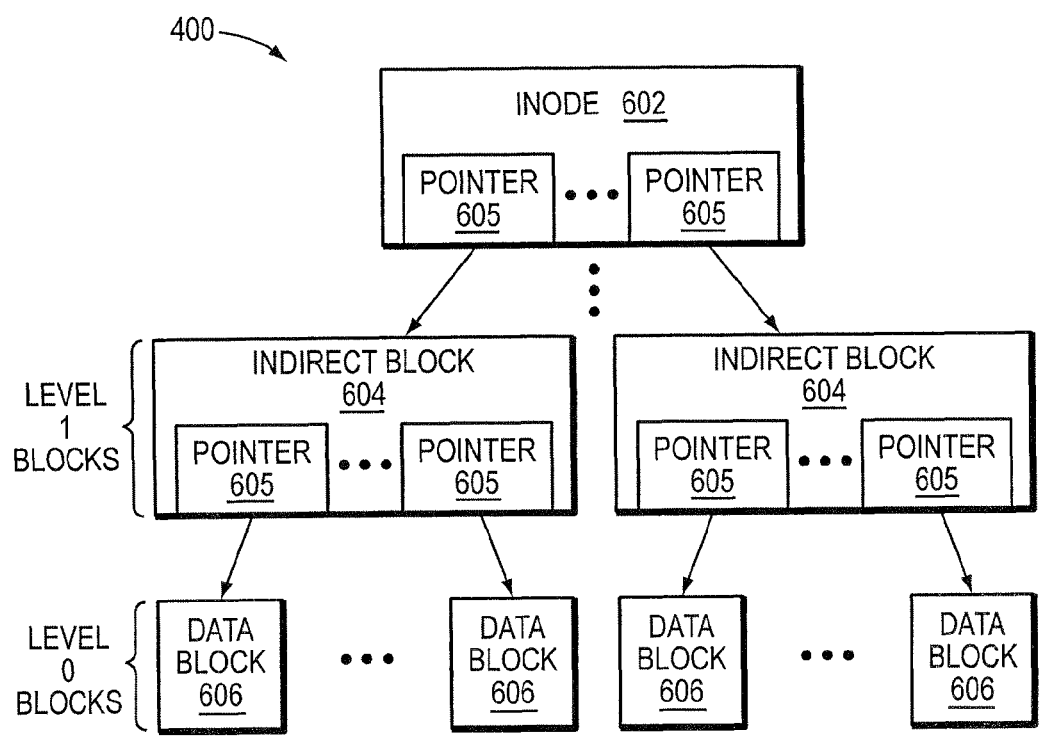
FIG. 4 is a diagram of a buffer tree according to an embodiment of the present invention.

File system 280 maintains various data structures, called buffer trees, to keep track of the organization of data blocks that store data (an exemplary buffer tree and its structure are shown in FIG. 4). For any particular file, there are generally two relevant buffer trees, namely a container file buffer tree (hereinafter "container buffer tree") and a user file buffer tree (hereinafter "user buffer tree"). The user buffer tree represents the particular file, while the container buffer tree represents the volume which contains the file. Normally, the user buffer tree is used to locate blocks in a file in response to a client-initiated read or write request.

Referring now to FIG. 4, a user buffer tree 400 is shown. The buffer tree 400 includes data blocks. Some of these blocks contain actual data—these are referred to as "direct blocks" (e.g., data blocks 606). Some blocks in a buffer tree contain pointers to other blocks—these are referred to as "indirect blocks" (e.g., indirect blocks 604). There can be multiple levels of indirect blocks in a buffer tree (one level of indirect blocks, Level 1, is shown for simplicity only). There is one level (Level 0) of direct blocks, which is the lowest level of the buffer tree. In the illustrative embodiment, a file is represented in the write-anywhere file system as an mode data structure adapted for storage on the storage devices 130. The root of the buffer tree is known as an "mode" (602). Inode is a structure that contains metadata about the file, such as the type of the file (e.g., regular, directory, virtual disk), its size, time stamps (e.g., access and/or modification) for the file and ownership (i.e., user identifier and group ID). An mode and indirect block in the user buffer tree shown in FIG. 4 includes a pair of associated pointers (e.g., pointers 605) for a lower level block that it references, namely, a Virtual Block Number (VBN) (an address of the block in the aggregate) and a Virtual Volume Block Number (VVBN) (an address of the block in the volume). Every mode and indirect block in the container buffer tree also includes PVBN for every lower level block that it references.

Typically, when accessing a data block in response to servicing a read request initiated by the client, the file system 280 specifies VVBN that is translated at the file system 280 into a PVBN location on a particular storage device within a RAID group of the physical volume. Each block in the VVBN space and in the PVBN space is typically fixed, e.g., 4 k bytes (kB), in size. The storage device location specified by a RAID system 236 (shown in FIG. 2) is further translated by a storage device driver system 235 (shown in FIG. 2) of the storage operating system 200 into a plurality of sectors (e.g., a 4 kB block with a RAID header is translated to 8 or 9 disk sectors of 512 or 520 bytes) on the specified storage device so that the data block will be written to a storage device at the next consistency point. A consistency point is the recurring event at which any new or modified data that has been temporarily cached in the storage system's buffer cache 170 is committed to long-term storage (e.g., at storage devices). A consistency point typically occurs periodically, i.e., from time to time (e.g., every 10 seconds) or in response to a predetermined condition occurring (e.g., a specified percentage of memory is full of "dirty" data).

According to embodiments of the present invention, storage system 120 executes other components that perform functionality of the invention. Referring again to FIG. 2, storage system 120 executes a monitoring module 260 configured to periodically monitor performance of storage devices and determine estimated service latency (L) of individual storage devices (a mechanism for determining latency is described in greater detail herein). Monitoring module 260 is configured to provide L and identification (ID) of the storage devices to a load balancing module 290.

The load balancing module 290 is configured to receive the latency and ID of storage devices and determine which storage device has the highest latency (e.g., "hot storage device"). Load balancing module 290 may identify a number or a percentage of the hottest storage devices, e.g., disks with the N highest latencies. Load balancing module 290 is configured to provide the ID of the hot storage device (or IDs of a number of hot storage devices) to a cooling module 284. The cooling module 284 is configured to receive the ID of the hottest storage device (or a number of hot storage devices). Cooling module 284 provides an indication in a storage devices data structure (not shown) in memory 124 that a storage device identified by a particular ID is entering a cooling mode (e.g., data blocks accessed on that storage device will be read into the memory during a client access request and written to other storage devices). Such a data structure for each storage device is maintained, for example, by a RAID system, after being initially provided to the file system 280, for example, when the RAID array is mounted.

The file system 280 is further configured to receive a read request from the client 110 and to determine whether the requested data blocks are stored in a memory. If the requested data are stored in the memory, the data block is copied to a buffer and is sent to the client over the network. If the requested data is not in memory, the file system 280 creates a storage device request and sends the request to the storage device driver system 235 (further details of sending and processing such a request are described in the "Methods of Operation" section). The requested data is then provided to the file system 280. When the requested data is provided to the file system, the file system marks for reallocation data blocks that are read from the storage device in the cooling mode.

File system 280 further includes a write allocation module 282 configured to identify in the buffer cache 170 data blocks marked for reallocation (i.e., to be stored on other storage devices), to determine new locations for those data blocks, and to send a write request to the storage device driver system 235 to write the data blocks at the new locations. The write allocation module 282 uses a block allocation data structure, such as for example, block allocation data structure 286, to select free physical blocks (e.g., blocks on storage devices) to which to write new data. In one embodiment, data structure 286 is implemented as a bitmap in which a value of "1" may indicate that a data block is allocated (e.g., a data block that is currently occupied by any data or metadata) and a value of "0" (zero) may indicate that a data block is not allocated (e.g., not occupied by any data or metadata). A person of ordinary skill in the art would understand that other values may indicate whether a particular data block is allocated.

The storage device management system 240 of the storage operating system 200 includes the RAID system 236 and the storage device driver system 235. RAID system 236 (also referred to herein as a "storage module") manages storage and retrieval of the information to and from the storage devices in accordance with input/output (I/O) operations. The RAID system 236 is also responsible for parity operations in the storage system 120. RAID system 236 maintains storage devices data structures (described herein) for each RAID group (these data structures are not shown in FIG. 2). A data structure for a RAID group points to one or more data structures that identify storage devices included in the RAID group. The storage devices data structure (not shown in FIG. 2) may include the storage device's serial number, the storage device's location, the storage device's size, and a handle to identify the storage device that is used when sending requests to storage device driver system 235. Such a data structure is presented to the file system when an aggregate is mounted and is used by the cooling module to provide an indication whether a particular storage device is in a cooling mode. In one embodiment, RAID system 236 can be a software module executed on the storage system 120. In an alternative embodiment, RAID system 236 can be a separate controller implemented as hardware. As described herein, RAID system 236 may implement various protocols, such as, for example, RAID-4, RAID-5, or RAID-DP.

Storage device driver system 235 allows storage system 120 to communicate with the storage devices 130. The storage device driver system 235 may implement a lower-level storage device access protocol, such as Fibre Channel protocol or SCSI. System 235 issues internal I/O commands to storage devices 130, in response to read/write requests received from the file system 280. These commands can be a command to write data at a physical block address at storage device 130 or a command to read data from a physical block address at storage device 130.

Storage device driver system 235 includes the earlier mentioned monitoring module 260 configured to determine latency of individual storage devices and to provide the measured latency to load balancing module 290. In addition, monitoring module 260 can be configured to determine other statistics, such as utilization of individual storage devices, as well as different types of errors received from the storage devices. Such errors are conventionally generated as provided by storage device drives' manufacturers. Further, the monitored information may include a number of read and write requests received by storage devices, the amount of data read by a particular storage device, and the amount of data written to a particular storage device. The monitored data may be kept in memory 124 of the storage system 120.

Storage operating system 200 further includes a protocol module 232 configured to decode incoming client requests or encode outgoing responses to the client requests in the appropriate protocol. Protocol module 232 implements one or more of various high-level network protocols, such as Network File System (NFS), Common Internet File System (CIFS), Hypertext Transfer Protocol (HTTP) and/or Transmission Control Protocol/Internet Protocol (TCP/IP).

Storage operating system 200 further includes a network access module 233, which implements one or more lower-level protocols to communicate over the network, such as Ethernet. The protocol module 232 and the associated network access module 233 allow the storage system 120 to communicate with client 110.

Methods of Operation

Embodiments of the present invention describe a process by which data blocks, which are brought into the memory of the storage system 120 as a result of operations initiated externally by clients requesting services of the storage system, are written to another disk drive in a RAID array if the data blocks were read from the disk drive in the array having high service latency.

A. Monitoring Process

Monitoring module 260 periodically monitors performance of storage devices, calculates an estimated latency (L) of storage devices (in milliseconds (ms)), and provides the calculated latency and IDs of the disks to load balancing module 290. Latency can be expressed as a sum of a seek time of an individual disk in the array (time to access data storage medium in response to a request) and the time the request waits in the queue to be processed by the disk. In one implementation, estimated latency is determined using the following formula:

New Estimated Latency=$X$*Decayed Old Estimated Latency+$(1-X)$*Latency_latest; wherein "$X$" is a decaying value $\{0<X<1\}$;

Thus, the new estimated latency calculated as the sum of the decayed old estimate of latency and a scale factor of the latest measurement (Latency_latest). A scale factor is a number which scales or multiplies some quantity. For example, "$X$" is a scale factor of Latency. According to the formula, the contribution of a single access decays exponentially with subsequent accesses to a storage device.

If $X$=0.9, Decayed Old Estimated Latency=10 ms, and Latency_latest=10 ms, then New Estimated Latency=0.9(10)+(1−0.9)(10)=10, If Decayed Old Estimated Latency=10 and Latency_latest=0, New Estimated Latency=0.9(10)+(1−0.9)(0)=9.

Those skilled in the art would understand that other formulas can be chosen to determine estimated latency of the storage devices. Although in one embodiment monitoring module 260 is implemented at the storage device management system 240, the monitoring process can be performed at the file system level in other implementations.

B. Load Balancing Process

Figure 3A:
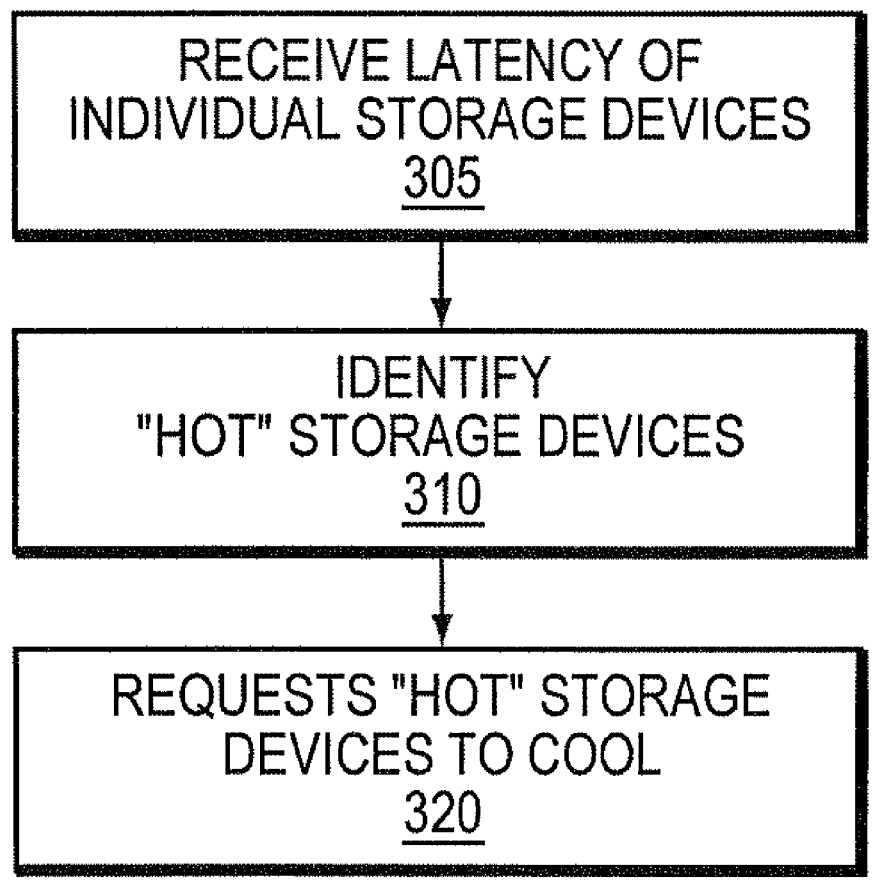
FIG. 3A is a flow diagram of the steps performed by a load balancing process to reduce load imbalance in an aggregate according to an embodiment of the present invention.

Referring now to FIG. 3A, it illustrates the steps performed by load balancing module 290 to identify hot storage devices (i.e., storage devices having high service latency) in a logical set or group of devices, e.g., in an aggregate, and to request that the hot storage devices be cooled. Load balancing module 290 receives (from monitoring module 260), at step 305, new estimated latency of individual storage devices and IDs of the storage devices and uses this information to identify the hottest storage device (storage device having the highest latency) (at step 310). In another implementation, load balancing module 290 identifies a number or percentage of hot storage devices in the aggregate, e.g., statistically (those with above average latency or those in the top quartile) or using other selected methodology set manually by a storage system administrator or a user. Load balancing module 290 then provides to cooling module 284 an ID of the hottest disk (or IDs of a percentage/a number of hot storage devices) (step 320). The cooling module 284 provides an indication in the storage device data structure (in memory 124) corresponding to a hot storage device that the storage device will be entering a cooling mode.

Generally, when a read request is received from client 110, file system 280 searches buffer cache 170 to determine if the requested data is in memory. To this end, various levels of indirect blocks (e.g., indirect blocks 604 shown in FIG. 4) are searched until data blocks are found in the memory. If the requested data block is stored in memory, the data block is copied to a buffer and is sent to the client over the network.

If, after searching various levels of indirect blocks (which eventually point to direct blocks in the buffer tree shown in FIG. 4) the requested data is not found, the file system 280 creates a storage device request. The request includes, for example, a buffer header, which indicates, for example, an address of a data block in a VBN space, an ID of a storage device where the data block is stored, and a number of blocks to read. The request is received by the RAID system 236. The RAID system stores mappings between addresses of data blocks in VBN space and PVBN space. The RAID system provides a physical block address in a PVBN space corresponding to the VBN address. The read request is then passed to the storage device driver system 235.

According to embodiments of the present invention, the storage device driver system 235 determines whether the request is made against a storage device that is in a cooling mode. In one implementation, the storage device driver system 355 requests the disk cooling module 284 to provide such an indication. The cooling module 284 looks up the storage devices data structure in memory to determine whether the request is made against a storage device that is cooling. If the device is in the cooling mode, the storage device driver system 235 may set a bit in the buffer header to indicate that the storage device is in the cooling mode. The storage device driver system 235 sends an I/O request to the storage device to retrieve the data block identified by the physical address. Upon receiving the requested data block(s), the storage device driver system 235 sends the buffer header along with the retrieved data block back to the file system 280.

The file system 280 receives the buffer header and reads the bit in the buffer header that indicates whether the request was made against the storage device that is in a cooling mode. If the request was made against the storage device that is in the cooling mode, the file system marks the data block, in the buffer header, for reallocation. In one implementation, the file system 280 sets a "dirty" bit next to the data block in the buffer cache to indicate that the data block will be written to new locations on another disk.

C. Write Allocation Process

Figure 3B:
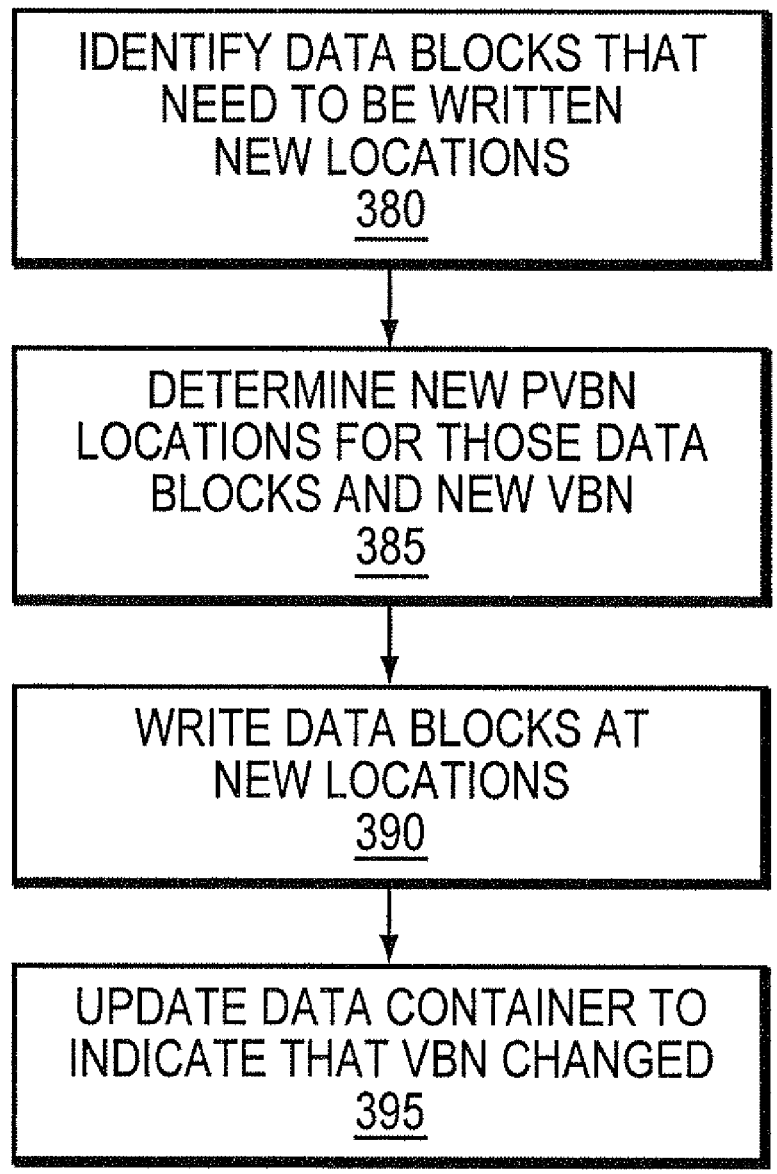
FIG. 3B is a flow diagram of the steps performed by a write allocation module according to an embodiment of the present invention.

Referring now to FIG. 3B, it illustrates steps performed by write allocation module 282 when it writes to new locations data blocks marked to be written to another storage device.

Write allocation module 282 identifies data blocks marked as "dirty" within the buffer cache 170 (step 380). At step 385, write allocation module 282 determines new on-disk locations (i.e., new PVBNs) for those blocks (step 385) using, for example, the block allocation data structure 286 to determine which physical data blocks on storage devices do not store data or metadata. Write allocation module 282 also uses the storage devices data structures for RAID groups, which points to data structures for one or more storage device in a RAID group. Write allocation module 282 seeks to select physically contiguous sections of RAID groups (such as RAID group 160, 162, and 164 shown in FIG. 1C to which to write). In one implementation, the write allocation module 282 advances a pointer set regarding a list of physical devices, advancing on one storage device at a time in order to get contiguous (or semi-contiguous) allocation of data blocks on a storage device. At the next consistency point, write allocation module 282 sends write requests to the storage device driver system 235 to store the data blocks that are marked to be written (e.g., data blocks that have a "dirty" bit set next to them) (step 390). To this end, write allocation module 282 provides an ID of a storage device to which the cursor currently points. Storage device driver system 235 writes these data blocks at the storage device to which the cursor currently points.

Write allocation module 282 then updates the block allocation data structure 286 (shown in FIG. 2) to reflect that the PVBNs corresponding to the new locations are now in use by the active file system (e.g., a file system to which data can be both written and read). Write allocation module 282 then updates VBN in a container buffer tree (step 395).

The process described in FIG. 3B occurs at each consistency point and is described in the context of moving data blocks to other locations as a result of servicing "normal read requests", and does not require an additional read operation. A person of ordinary skill in the art would understand that FIG. 3B illustrates those operations which relate to the technique introduced herein and does not list every operation that may occur at a consistency point. In other embodiments, data can be relocated during read requests initiated internally, for example, as part of the storage system's maintenance, such as during a scrubbing operation (e.g., an operation during which validity of the data stored on a storage device is checked by using (and comparing) checksums, a value calculated when data are written to a storage device and again during the scrubbing operation).

As part of the cooling process, the estimated service latency for the hot storage devices can be further reduced by preventing write requests from going to the storage devices selected for cooling. To write data on a storage medium, such as on a disk, typically, the write allocation module 282 requests a free block on a storage device to store data and then asks for a new storage device from which to allocate data blocks. According to an embodiment of the present invention, to exclude a storage device from write allocation, the data structure for the storage device in a cooling mode is marked with a bit so that its cursor is not selected by the write allocation module 282 for data block allocation. As a result, a data block(s) is not written to that storage device. A person of ordinary skill in the art would understand that preventing write requests from going to cooling storage devices can be an optional step and that the invention can operate without this step.

A storage device in a storage system can be filled with infrequently accessed data blocks. Because such a storage device may not have room for new data, it makes it difficult for the storage device to be a target for migration of data from hot storage devices. In cases like this, infrequently accessed data have to be removed from the storage device. Since data on "cooler" storage devices (i.e., storage devices having a low service latency) are accessed less frequently and since in typical applications of such systems most data blocks are cool, any randomly selected blocks on cooler storage devices can be moved to other storage devices, such as storage devices that have high service latency (e.g., hot storage devices). According to one embodiment, data blocks are moved from relatively cool storage devices during the course of normal read operations by the storage system, such as during client-initiated read requests, internally associated read requests, etc. More precisely, the blocks are marked as "dirty", i.e. tagged as "to be moved", during a read and are actually moved at the next "consistency point".

According to another embodiment, data blocks from cool storage devices can be moved to hot storage devices during the course of operations other than servicing client requests. These mechanisms are described in more detail in a commonly owned pending patent application entitled "Method and Apparatus for Defragmentation and For Detection of Relocated Blocks", by Robert English and Ashish Prakash, filed on Jan. 19, 2006, and identified by U.S. Ser. No. 11/336,755, issued as U.S. Pat. No. 7,702,870 on Apr. 20, 2010. In another embodiment, load balancing proceeds when there is free space on cool storage devices without removing cool data blocks from cool storage devices.

Thus, a mechanism for reducing load imbalance in a storage system is described. As hot storage devices are being cooled, their service latency is being reduced. The service latency of less loaded storage devices, in turn, increases. This balances the load on the storage devices in a group of storage devices. This mechanism advantageously allows the storage system to efficiently grow the existing aggregate without creating load imbalance.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims. For example, in alternative embodiments, a user or an external policy engine that monitors performance of the storage system 120 may designate storage devices to cool. Those of skill in the art would understand that the technique described herein can be implemented at the file system level rather than at the storage device management system level or both at the file system level and the management system level.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for reducing load imbalance in a set of storage devices operatively connected to a storage system, comprising:
    monitoring performance of a storage device of the set of storage devices;
    determining that the storage device has a high service latency;
    receiving a request for data stored on the storage device;
    in response to receiving the request for data stored on the storage device that has the high service latency, creating at the storage system a storage device request for the data that indicates in the storage device request that the storage device with the requested data has the high service latency;
    caching the data in memory of the storage system in response to the storage device request; and
    in response to the storage device request indicating that the storage device with the requested data has the high service latency, storing the requested data from the memory to a second storage device operatively connected to the storage system.

2. The method of claim 1, further comprising preventing new data from being written to the storage device that has the high service latency in response to determining that the storage device has the high service latency.

3. The method of claim 1, wherein determining further comprises identifying a number of storage devices that have the high service latency.

4. The method of claim 1, wherein service latency comprises a sum of a seek time of the storage device and a time the storage device request is waiting in a queue to be processed.

5. The method of claim 1, further comprising forming a Redundant Array of Independent (or Inexpensive) Disks (RAID) using the set of storage devices.

6. The method of claim 4, wherein the service latency is a parameter based at least upon changes in a data load of the storage device.

7. The method of claim 1, wherein storing the data at the second storage device comprises storing the data at the second storage device without performing a second read operation for the data at the storage device that has the high service latency to be cached in the memory.

8. The method of claim 1, wherein the request comprises a client request.

9. The method of claim 1, wherein indicating comprises setting a bit in the storage device request.

10. The method of claim 9, wherein the bit is set in a buffer header of the storage device request.

11. A method for reducing load imbalance in a set of storage devices, comprising:
    connecting a client to a storage system operatively connected to the set of storage devices;
    determining service latency of a storage device in the set of storage devices;
    identifying that the storage device has a high service latency;
    receiving a client request from the client for data stored on the storage device;
    in response to receiving the client request for data stored on the storage device that has the high service latency, creating at the storage system a storage device request for the data that indicates in the storage device request that the storage device with the requested data has the high service latency;

caching the data from the storage device in memory of the storage system in response to the storage device request; and storing the data at a second storage device operatively connected to the storage system using the data cached in the memory in response to the storage device request indicating that the storage device with the requested data has the high service latency.

12. The method of claim 11, further comprising forming a Redundant Array of Independent (or Inexpensive) Disks (RAID) using the set of storage devices.

13. The method of claim 11, wherein indicating comprises setting a bit in the storage device request.

14. The method of claim 13, wherein the bit is set in a buffer header of the storage device request.

15. A storage system configured to reduce load imbalance in a set of storage devices operatively connected to the storage system, comprising:

a processor of the storage system configured to execute a plurality of modules, wherein a first module of the plurality of modules is configured to monitor performance of a storage device of the set of storage devices;

a second module of the plurality of modules configured to receive information from the first module and further configured to identify the storage device as having a high service latency;

a third module of the plurality of modules configured to indicate that the storage device has the high service latency;

a storage operating system executed by the processor configured to create a storage device request for data;

a storage device driver of the storage system configured to read data requested from the storage device in response to the storage device request;

a fourth module of the plurality of modules configured to indicate in the storage device request for the data that the storage device with the requested data has the high service latency;

a memory of the storage system configured to store the data; and a fifth module of the plurality of modules configured to select a second storage device operatively connected to the storage system to store the data using the data stored in the memory in response to the storage device request indicating that the storage device with the data has the high service latency.

16. The storage system of claim 15, wherein the third module and the fifth module comprise program code executed by the processors.

17. The storage system of claim 15, wherein the third module is further configured to indicate that the storage device that has the high service latency is in a cooling mode.

18. The storage system of claim 15, wherein the set of storage devices are configured to be organized as a Redundant Array of Independent (or Inexpensive) Disks (RAID).

19. The storage system of claim 15, wherein the storage operating system is configured to create the storage device request in response to one of a received client request for the data and a received internally initiated storage device request for the data.

20. The system of claim 15, wherein the storage device request comprises a buffer header.

21. The system of claim 20, wherein a bit in the buffer header indicates that the storage device with the requested data has the high service latency.

22. A computer-readable storage medium comprising program instructions configured to be executed by a processor, comprising:

program instructions that monitor performance of a storage device of a set of storage devices operatively connected to a computer;

program instructions that determine that the storage device has a high service latency;

program instructions that receive a request for data stored on the storage device that has the high service latency;

program instructions that, in response to receiving the request for data stored on the storage device that has the high service latency, create at the storage system a storage device request for the data that indicates in the storage device request that the storage device with the requested data has the high service latency;

program instructions that cache the data in a memory of the storage system in response to the storage device request; and program instructions that, in response to the storage device request indicating that the storage device with the requested data has the high service latency, store the data from the memory to a second storage device operatively connected to the computer.

23. The computer-readable storage medium of claim 22, further comprising program instructions that suppress a write request to the storage device that has the high service latency in response to determining that the storage device has the high service latency.

24. The computer-readable storage medium of claim 22, further comprising program instructions that store a data block of the data at the second storage device while servicing the storage device request.

25. The computer-readable storage medium of claim 22, wherein the request comprises an internally initiated storage device request.

26. The computer-readable storage medium of claim 22, wherein the set of storage devices are configured to be organized as one or more Redundant Array of Independent (or Inexpensive) Disks (RAIDs) of storage devices.

* * * * *

UNITED STATES PATENT AND TRADEMARK OFFICE
CERTIFICATE OF CORRECTION

| | | |
|---|---|---|
| PATENT NO. | : 7,984,259 B1 | Page 1 of 1 |
| APPLICATION NO. | : 11/957925 | |
| DATED | : July 19, 2011 | |
| INVENTOR(S) | : Robert M. English | |

It is certified that error appears in the above-identified patent and that said Letters Patent is hereby corrected as shown below:

In Col. 7, line 59 should read:
  represented in the write-anywhere file system as an ~~mode~~ inode data In Col. 7, line 61 should read:
  root of the buffer tree is known an an "~~mode~~inode" (602). Inode is In Col. 7, line 65 should read:
  ownership (i.e., user identifier and group ID). An ~~mode~~ inode and In Col. 8, line 4 should read:
  the volume). Every ~~mode~~ inode and indirect block in the container Signed and Sealed this
First Day of May, 2012

David J. Kappos
*Director of the United States Patent and Trademark Office*